United States Patent
Mitra et al.

(10) Patent No.: US 8,424,326 B2
(45) Date of Patent: *Apr. 23, 2013

(54) REFRIGERANT VAPOR COMPRESSION SYSTEM AND METHOD OF TRANSCRITICAL OPERATION

(75) Inventors: Biswajit Mitra, Charlotte, NC (US); Yu H. Chen, Manlius, NY (US); Jason Scarcella, Cicero, NY (US); Suresh Duraisamy, Liverpool, NY (US); Lucy Yi Liu, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 794 days.

This patent is subject to a terminal disclaimer.

(21) Appl. No.: 12/596,883

(22) PCT Filed: Apr. 24, 2007

(86) PCT No.: PCT/US2007/010065
§ 371 (c)(1),
(2), (4) Date: Oct. 21, 2009

(87) PCT Pub. No.: WO2008/130357
PCT Pub. Date: Oct. 30, 2008

(65) Prior Publication Data
US 2010/0115975 A1    May 13, 2010

(51) Int. Cl.
 F25B 41/00    (2006.01)
 F25B 39/04    (2006.01)
 F25B 1/10    (2006.01)

(52) U.S. Cl.
 USPC ............................. 62/196.1; 62/509; 62/510

(58) Field of Classification Search .................. 62/196.1, 62/115, 174, 503, 504, 510, 513, 509; 700/282; 418/55.1
See application file for complete search history.

(56) References Cited

U.S. PATENT DOCUMENTS

| 4,707,996 A | 11/1987 | Vobach |
| 5,174,123 A | 12/1992 | Erickson |

(Continued)

FOREIGN PATENT DOCUMENTS

| JP | 62502836 | 11/1987 |
| JP | 4227438 | 8/1992 |
| JP | 10318614 | 12/1998 |
| JP | 11094368 | 4/1999 |

(Continued)

OTHER PUBLICATIONS

International Search Report and Written Opinion mailed Dec. 20, 2007 (10 pgs.).

(Continued)

*Primary Examiner* — Chen Wen Jiang
(74) *Attorney, Agent, or Firm* — Cantor Colburn LLP (57) ABSTRACT

A refrigerant vapor compression system includes a flash tank economizer defining a separation chamber is disposed in the refrigerant circuit intermediate a refrigerant heat rejection heat exchanger and a refrigerant heat absorption heat exchanger. A primary expansion valve is interdisposed in the refrigerant circuit in operative association with and upstream of the refrigerant heat absorption heat exchanger and a secondary expansion valve is interdisposed in the refrigerant circuit in operative association and upstream of the flash tank economizer. A refrigerant vapor injection line establishes refrigerant flow communication between an upper portion of the separation chamber and an intermediate pressure stage of the system's compression device and a suction pressure portion of the refrigerant circuit. A refrigerant liquid injection line establishes refrigerant flow communication between a lower portion of said separation chamber and an intermediate pressure stage of the compression device and a suction pressure portion of the refrigerant circuit.

42 Claims, 2 Drawing Sheets

U.S. PATENT DOCUMENTS

| | | | |
|---|---|---|---|
| 6,058,729 | A | 5/2000 | Lifson et al. |
| 6,385,980 | B1 | 5/2002 | Sienel |
| 6,438,978 | B1 | 8/2002 | Bessler |
| 6,679,074 | B2 | 1/2004 | Hanson |
| 6,694,750 | B1 | 2/2004 | Lifson et al. |
| 7,096,679 | B2 | 8/2006 | Manole |
| 7,114,349 | B2 | 10/2006 | Lifson et al. |
| 2004/0129015 | A1 | 7/2004 | Apparao et al. |
| 2005/0132729 | A1 | 6/2005 | Manole |
| 2006/0037354 | A1 | 2/2006 | Cho et al. |
| 2007/0012072 | A1 | 1/2007 | Qualls et al. |
| 2011/0023514 | A1* | 2/2011 | Mitra et al. .................... 62/222 |

FOREIGN PATENT DOCUMENTS

| | | |
|---|---|---|
| JP | 2000292016 | 10/2000 |
| JP | 2002213851 | 7/2002 |
| JP | 2006522312 | 9/2006 |

OTHER PUBLICATIONS

International Preliminary Report on Patentability mailed Nov. 5, 2009 (7 pgs.).

English language translation of Office Action for JP Patent Application No. 2010-506152, Feb. 14, 2012.

* cited by examiner

REFRIGERANT VAPOR COMPRESSION SYSTEM AND METHOD OF TRANSCRITICAL OPERATION

FIELD OF THE INVENTION

This invention relates generally to refrigerant vapor compression systems and, more particularly, to simultaneous efficiency and capacity improvement and improved refrigerant charge management in a refrigerant vapor compression system operating in a transcritical cycle.

BACKGROUND OF THE INVENTION

Refrigerant vapor compression systems are well known in the art and commonly used for conditioning air to be supplied to a climate controlled comfort zone within a residence, office building, hospital, school, restaurant or other facility. Refrigerant vapor compression system are also commonly used in refrigerating air supplied to display cases, merchandisers, freezer cabinets, cold rooms or other perishable/frozen product storage areas in commercial establishments.

Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal. Refrigerant vapor compression systems used in connection with transport refrigeration systems are generally subject to more stringent operating conditions due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also operate efficiently at low load when maintaining a stable product temperature during transport. Additionally, transport refrigerant vapor compression systems are subject to vibration and movements not experienced by stationary refrigerant vapor compression systems.

Traditionally, conventional refrigerant vapor compression systems commonly operate at subcritical refrigerant pressures and typically include a compressor, a condenser, and an evaporator, and expansion device, commonly an expansion valve, disposed upstream, with respect to refrigerant flow, of the evaporator and downstream of the condenser. These basic refrigerant system components are interconnected by refrigerant lines in a closed refrigerant circuit, arranged in accord with known refrigerant vapor compression cycles, and operated in the subcritical pressure range for the particular refrigerant in use. Refrigerant vapor compression systems operating in the subcritical range are commonly charged with fluorocarbon refrigerants such as, but not limited to, hydrochlorofluorocarbons (HCFCs), such as R22, and more commonly hydrofluorocarbons (HFCs), such as R134a, R410A, R404A and R407C.

In today's market, greater interest is being shown in "natural" refrigerants, such as carbon dioxide, for use in air conditioning and transport refrigeration systems instead of HFC refrigerants. However, because carbon dioxide has a low critical temperature, most refrigerant vapor compression systems charged with carbon dioxide as the refrigerant are designed for operation in the transcritical pressure regime. In refrigerant vapor compression systems operating in a subcritical cycle, both the condenser and the evaporator heat exchangers operate at refrigerant temperatures and pressures below the refrigerant's critical point. However, in refrigerant vapor compression systems operating in a transcritical cycle, the heat rejection heat exchanger, which is a gas cooler rather than a condenser, operates at a refrigerant temperature and pressure in excess of the refrigerant's critical point, while the evaporator operates at a refrigerant temperature and pressure in the subcritical range. Thus, for a refrigerant vapor compression system operating in a transcritical cycle, the difference between the refrigerant pressure within the gas cooler and refrigerant pressure within the evaporator is characteristically substantially greater than the difference between the refrigerant pressure within the condenser and the refrigerant pressure within the evaporator for a refrigerant vapor compression system operating in a subcritical cycle.

It is also common practice to incorporate an economizer into the refrigerant circuit for increasing the capacity of the refrigerant vapor compression system. For example, in some systems, a refrigerant-to-refrigerant heat exchanger is incorporated into the refrigerant circuit as an economizer. U.S. Pat. No. 6,058,729 discloses a subcritical refrigerant vapor compression system for a transport refrigeration unit incorporating a refrigerant-to-refrigerant heat exchanger into the refrigerant circuit as an economizer. The disclosed system also includes a suction modulation valve (SMV) for throttling refrigerant flow to the suction inlet of the compressor and an intermediate pressure-to-suction pressure unload circuit for compressor capacity control. U.S. Pat. No. 7,114,349 discloses a refrigerant vapor compression system with a common economizer and liquid-suction heat exchanger interdisposed in the refrigerant circuit downstream of the condenser with respect to refrigerant flow and upstream of the evaporator with respect to refrigerant flow. Through various bypass lines and manipulation of various open/closed solenoid valves associated with the bypass lines, the common heat exchanger may be operated either as an economizer heat exchanger or as a liquid-suction heat exchanger.

U.S. Pat. No. 6,694,750 discloses a subcritical refrigeration system that includes a first refrigerant-to-refrigerant heat exchanger economizer and a second refrigerant-to-refrigerant heat exchanger economizer disposed in series in the refrigerant circuit between the condenser and the evaporator. Refrigerant passing through the primary refrigerant circuit from the condenser to the evaporator passes in series through the first pass of the first refrigerant-to-refrigerant heat exchanger and thence through the first pass of the second refrigerant-to-refrigerant heat exchanger before traversing the primary refrigerant circuit's single evaporator expansion valve prior to entering the evaporator. A second portion of the refrigerant passing from the condenser is diverted from the primary refrigerant circuit and passed through an auxiliary expansion valve and thence through the second pass of the first refrigerant-to-refrigerant heat exchanger prior to being injected into a high pressure stage of the compression process. A third portion of the refrigerant passing from the condenser is diverted from the primary refrigerant circuit and passed through another auxiliary expansion valve and thence through the second pass of the second refrigerant-to-refrigerant heat exchanger prior to being injected into a low pressure stage of the compression process.

In some systems, a flash tank economizer is incorporated into the refrigerant circuit between the condenser and the evaporator. In such case, the refrigerant leaving the condenser is expanded through an expansion device, such as a thermostatic expansion valve or an electronic expansion valve, prior to entering the flash tank wherein the expanded refrigerant separates into a liquid refrigerant component and a vapor refrigerant component. The vapor component of the refrigerant is thence directed from the flash tank into an intermediate pressure stage of the compression process. The liquid component of the refrigerant is directed from the flash tank through the system's main expansion valve prior to entering the evaporator. U.S. Pat. No. 5,174,123 discloses a subcritical vapor compression system incorporating a flash tank economizer in the refrigerant circuit between the condenser and the evaporator. U.S. Pat. No. 6,385,980 discloses a transcritical refrigerant vapor compression system incorporating a flash tank economizer in the refrigerant circuit between the gas cooler and the evaporator.

SUMMARY OF THE INVENTION

In an aspect of the invention, a refrigerant vapor compression system is provided having a primary refrigerant circuit including a refrigerant compression device, a refrigerant cooling heat exchanger disposed downstream of the compression device, a refrigerant heating heat exchanger disposed downstream of the refrigerant cooling heat exchanger, a primary expansion device disposed in the refrigerant circuit downstream of the refrigerant cooling heat exchanger and upstream of the refrigerant heating heat exchanger, and a flash tank disposed in the refrigerant circuit downstream of the refrigerant heat rejection heat exchanger and upstream of the primary expansion device. The flash tank defines a separation chamber wherein refrigerant in a liquid state collects in a lower portion of the separation chamber and refrigerant in a vapor state in a portion of the separation chamber above the liquid refrigerant. A secondary expansion device is disposed in the refrigerant circuit in operative association with and upstream with of the flash tank. A refrigerant vapor injection line establishes refrigerant flow communication between an upper portion of the separation chamber and an intermediate pressure stage of the compression device and a suction pressure portion of the primary refrigerant circuit. A refrigerant liquid injection line establishes refrigerant flow communication between a lower portion of the separation chamber and an intermediate pressure stage of the compression device and a suction pressure portion of the primary refrigerant circuit. A bypass line may be provided between the intermediate pressure stage of the compression device and a suction pressure portion of the primary refrigerant circuit.

The refrigerant vapor compression system may include a control system for selectively directing refrigerant vapor from the flash tank through the refrigerant vapor injection line for injection either into the primary refrigerant circuit at an intermediate pressure stage of the compression device or into a suction portion of the primary refrigerant circuit, and for selectively directing refrigerant liquid from the flash tank through the refrigerant liquid injection line for injection either into the primary refrigerant circuit at an intermediate pressure stage of the compression device or into a suction portion of the primary refrigerant circuit. The control system may also selectively or along with the above mentioned action direct the refrigerant from the intermediate pressure stage of the compression device into the suction portion of the primary refrigeration circuit. In an embodiment, the compression device may be single compressor having at least a first lower pressure compression stage and a second higher pressure compression stage. In an embodiment, the compression device may be a first compressor and a second compressor disposed in the refrigerant circuit in series refrigerant flow relationship with a discharge outlet of the first compressor in refrigerant flow communication with a suction inlet of the second compressor. In the single compressor arrangement or the dual compressor arrangement, each compressor may be a scroll compressor, a reciprocating compressor or a screw compressor.

In an embodiment, the control system includes a controller and a plurality of flow control valves operatively associated with the refrigerant vapor injection line and/or the refrigerant liquid injection line. The controller selectively controls the positioning of each of the plurality of flow control valves between its respective open and closed positions. The plurality of flow control valves may include a first flow control valve interdisposed in an upstream portion of the refrigerant vapor injection line, a second flow control valve interdisposed in an upstream portion of the refrigerant liquid injection line, a third flow control valve disposed upstream with respect to refrigerant flow of the intermediate pressure stage of the compression device and downstream with respect to refrigerant flow of both the first flow control valve and the second flow control valve, and a fourth flow control valve disposed upstream with respect to refrigerant flow of the suction pressure portion of the primary refrigerant circuit and downstream with respect to refrigerant flow of both the first flow control valve and the second flow control valve. In an embodiment, the compressor unload bypass line forms a downstream extension of both the refrigerant vapor injection line and the refrigerant liquid injection line, and the third and fourth flow control valves are interdisposed in the compressor unload bypass line. In an embodiment, each of the first, second, third and fourth flow control valves comprises a solenoid valve having a first open position and a second closed position. A suction modulation valve operatively controlled by the controller may be interdisposed in the refrigerant circuit downstream of the refrigerant heating heat exchanger and upstream of the compression device.

In another aspect of the invention, a method is provided for operating a refrigerant vapor compression system in a transcritical cycle that includes the steps of: compressing a refrigerant to a supercritical condition in a two-stage compression process; passing the supercritical pressure refrigerant in heat exchange relationship with a cooling medium; expanding the supercritical condition refrigerant in a first expansion step to a subcritical pressure to form a first expanded refrigerant including refrigerant vapor and refrigerant liquid; separating the first expanded refrigerant into a refrigerant vapor portion and a refrigerant liquid portion; expanding at least a portion of the refrigerant liquid portion in a second expansion step to a lower pressure to a second expanded refrigerant including refrigerant liquid; evaporating the second expanded refrigerant; selectively passing a portion of the first expanded refrigerant vapor portion either into an intermediate stage of the compression process or into a suction pressure portion of the refrigerant vapor compression system; selectively passing a portion of the refrigerant liquid portion either into an intermediate stage of the compression process or into a suction pressure portion of the refrigerant vapor compression system. In an embodiment, the method also includes the step of selectively bypassing refrigerant from the intermediate stage of the compression process into the suction pressure portion of the refrigerant vapor compression system.

In a first mode of operation, the method includes the steps of: selectively passing a portion of the refrigerant vapor portion into an intermediate pressure stage of the compression process; and selectively blocking passage of the refrigerant liquid portion either into an intermediate pressure stage of the compression process or into a suction pressure portion of the refrigerant vapor compression system. In a second mode of operation, the method includes the steps of: selectively passing a portion of the refrigerant vapor portion into an intermediate pressure stage of the compression process; and simultaneously selectively passing a portion of the refrigerant liquid portion into an intermediate pressure stage of the compression process. In a third mode of operation, the method includes the steps of: selectively passing a portion of the refrigerant vapor portion into a suction pressure portion of the refrigerant vapor compression system; and simultaneously selectively passing a portion of the refrigerant liquid portion into a suction pressure portion of the refrigerant vapor compression system. In a fourth mode of operation, the method includes the step of controlling the subcritical pressure of the flash tank at which the refrigerant separates in a refrigerant vapor and a refrigerant liquid by selectively passing a portion of the refrigerant vapor portion into a suction pressure portion of the refrigerant vapor compression system.

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Figure 1:
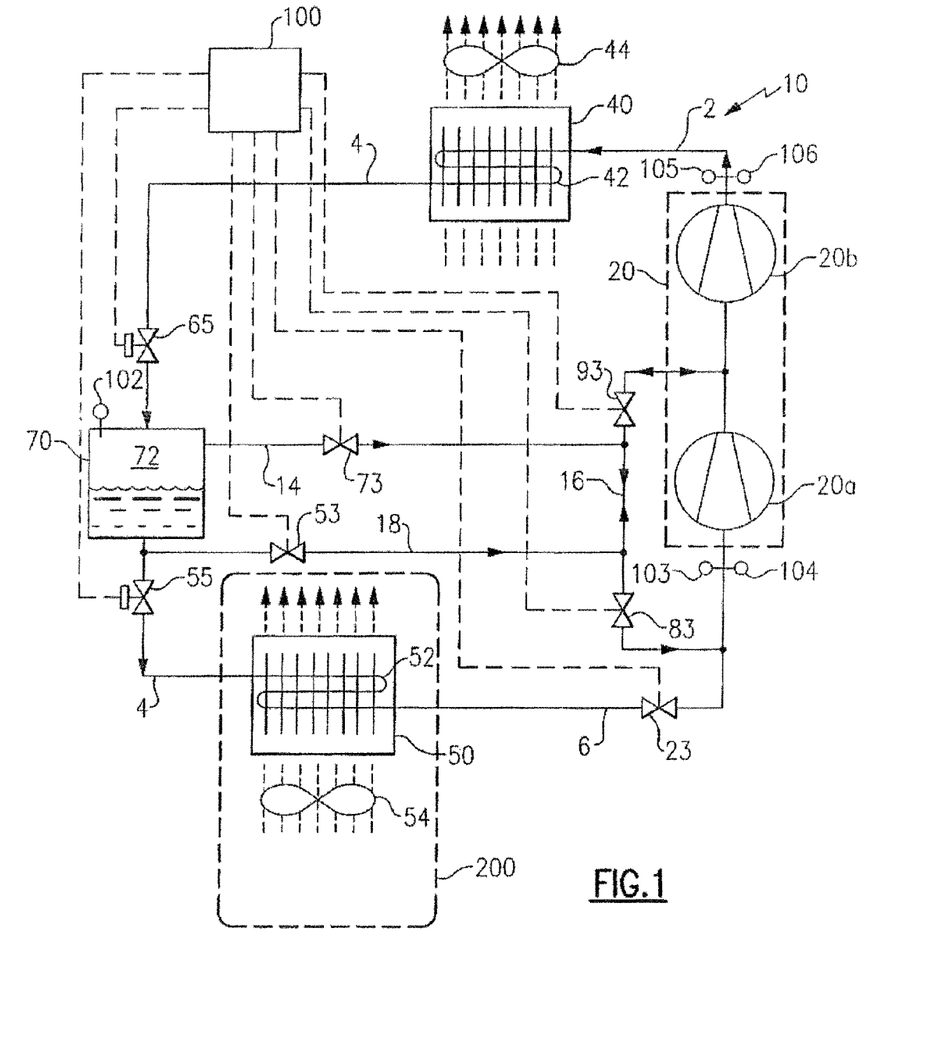
FIG. 1 is a schematic diagram illustrating a first exemplary embodiment of a refrigerant vapor compression system in accord with the invention.
Figure 2:
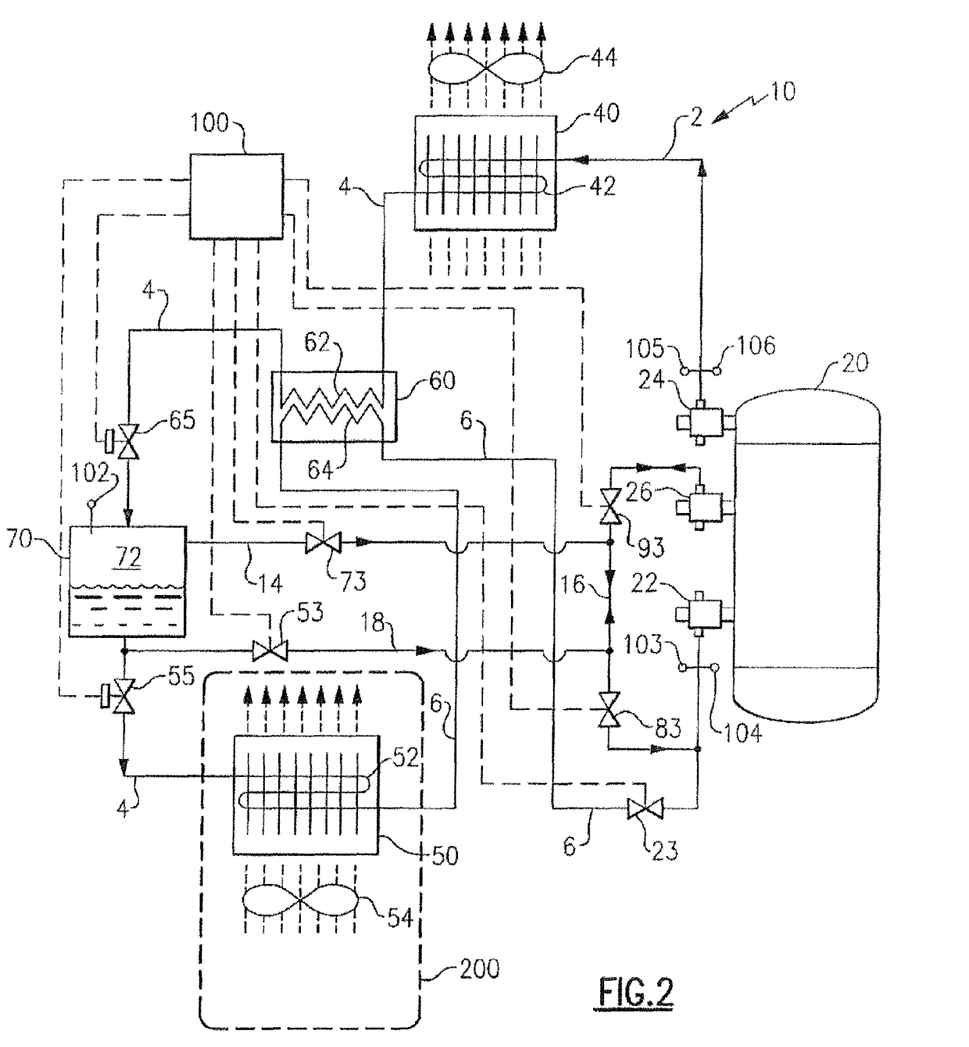
FIG. 2 is a schematic diagram illustrating a second exemplary embodiment of a refrigerant vapor compression system in accord with the invention.

Referring now to FIGS. 1 and 2, there are depicted therein exemplary embodiments of a refrigerant vapor compression system 10 suitable for use in a transport refrigeration system for refrigerating the air or other gaseous atmosphere within the temperature controlled cargo space of a truck, trailer, container or the like for transporting perishable/frozen goods. The refrigerant vapor compression system 10 is also suitable for use in conditioning air to be supplied to a climate controlled comfort zone within a residence, office building, hospital, school, restaurant or other facility. The refrigerant vapor compression system could also be employed in refrigerating air supplied to display cases, merchandisers, freezer cabinets, cold rooms or other perishable/frozen product storage areas in commercial establishments.

The refrigerant vapor compression system 10 is particularly adapted for operation in a transcritical cycle with a low critical temperature refrigerant, such as for example, but not limited to, carbon dioxide. However, it is to be understood that the refrigerant vapor compression system 10 may also be operated in a subcritical cycle with a higher critical such as conventional hydrochlorofluorocarbon and hydrofluorocarbon refrigerants. The refrigerant vapor compression system 10 includes a multi-step compression device 20, a refrigerant heat rejecting heat exchanger 40, a refrigerant heat absorbing heat exchanger 50, also referred to herein as an evaporator, and a primary expansion valve 55, such as for example an electronic expansion valve or a thermostatic expansion valve, operatively associated with the evaporator 50, with refrigerant lines 2, 4 and 6 connecting the aforementioned components in a primary refrigerant circuit.

In a refrigerant vapor compression system operating in a transcritical cycle, the refrigerant heat rejecting heat exchanger 40 constitutes a gas cooler through which supercritical refrigerant passes in heat exchange relationship with a cooling medium, such as for example, but not limited to ambient air or water, and may be also be referred to herein as a gas cooler, In a refrigerant vapor compression system operating in a subcritical cycle, the refrigerant heat rejecting heat exchanger 40 would constitute a refrigerant condensing heat exchanger through which hot, high pressure refrigerant passes in heat exchange relationship with the cooling medium. In the depicted embodiments, the refrigerant heat rejecting heat exchanger 40 includes a finned tube heat exchanger 42, such as for example a fin and round tube heat exchange coil or a fin and mini-channel flat tube heat exchanger, through which the refrigerant passes in heat exchange relationship with ambient air being drawn through the finned tube heat exchanger 42 by the fan(s) 44 associated with the gas cooler 40.

The refrigerant heat absorption heat exchanger 50 serves an evaporator wherein refrigerant liquid is passed in heat exchange relationship with a fluid to be cooled, most commonly air, drawn from and to be returned to a temperature controlled environment 200, such as the cargo box of a refrigerated transport truck, trailer or container, or a display case, merchandiser, freezer cabinet, cold room or other perishable/frozen product storage area in a commercial establishment, or to a climate controlled comfort zone within a residence, office building, hospital, school, restaurant or other facility. In the depicted embodiments, the refrigerant heat absorbing heat exchanger 50 comprises a finned tube heat exchanger 52 through which refrigerant passes in heat exchange relationship with air drawn from and returned to the refrigerated cargo box 200 by the evaporator fan(s) 54 associated with the evaporator 50. The finned tube heat exchanger 52 may comprise, for example, a fin and round tube heat exchange coil or a fin and mini-channel flat tube heat exchanger.

The compression device 20 functions to compress the refrigerant and to circulate refrigerant through the primary refrigerant circuit as will be discussed in further detail hereinafter. The compression device 20 may comprise a single multiple stage refrigerant compressor, such as for example a scroll compressor, a screw compressor or a reciprocating compressor, disposed in the primary refrigerant circuit and having a first compression stage 20a and a second compression stage 20b. The first and second compression stages are disposed in series refrigerant flow relationship with the refrigerant leaving the first compression stage passing directly to the second compression stage for further compression. Alternatively, the compression device 20 may comprise a pair of independent compressors 20a and 20b, connected in series refrigerant flow relationship in the primary refrigerant circuit via a refrigerant line connecting the discharge outlet port of the first compressor 20a in refrigerant flow communication with the suction inlet port of the second compressor 20b. In the independent compressor embodiment, the compressors 20a and 20b may be scroll compressors, screw compressors, reciprocating compressors, rotary compressors or any other type of compressor or a combination of any such compressors. In the exemplary embodiment depicted in FIG. 2, the compressor 20 is a scroll compressor having a suction inlet 22 and discharge outlet 24 and a port 26 opening directly to an intermediate pressure stage of the compression chamber of the compressor.

Additionally, the refrigerant vapor compression system 10 of the invention includes a flash tank economizer 70 interdisposed in refrigerant line 4 of the primary refrigerant circuit downstream with respect to refrigerant flow of the gas cooler 40 and upstream with respect to refrigerant flow of the evaporator 50. A secondary expansion device 65 is interdisposed in refrigerant line 4 in operative association with and upstream of the flash tank economizer 70. The secondary expansion device 65 may be an electronic expansion valve, such as depicted in FIGS. 1 and 2, or a fixed orifice expansion device. Refrigerant traversing the secondary expansion device 65 is expanded to a lower pressure sufficient to establish a mixture of refrigerant in a vapor state and refrigerant in a liquid state. The flash tank economizer 70 defines a separation chamber 72 wherein refrigerant in the liquid state collects in a lower portion of the separation chamber and refrigerant in the vapor state collects in the portion of the separation chamber 72 above the liquid refrigerant.

Liquid refrigerant collecting in the lower portion of the flash tank economizer 70 passes therefrom through refrigerant line 4 and traverses the primary refrigerant circuit expansion valve 55 interdisposed in refrigerant line 4 upstream with respect to refrigerant flow of the evaporator 50. As this liquid refrigerant traverses the first expansion device 55, it expands to a lower pressure and temperature before entering enters the evaporator 50. The evaporator 50 constitutes a refrigerant evaporating heat exchanger through which expanded refrigerant passes in heat exchange relationship with the air to be cooled, whereby the refrigerant is vaporized and typically superheated. As in conventional practice, the primary expansion valve 55 meters the refrigerant flow through the refrigerant line 4 to maintain a desired level of superheat in the refrigerant vapor leaving the evaporator 50 to ensure that no liquid is present in the refrigerant leaving the evaporator. The low pressure refrigerant vapor leaving the evaporator 50 returns through refrigerant line 6 to the suction port of the first compression stage or first compressor 20a of the compression device 20 in the embodiment depicted in FIG. 1, or to the suction inlet 22 of the scroll compressor 20 in the embodiment depicted in FIG. 2.

The refrigerant vapor compression system 10 also includes a refrigerant vapor injection line 14 and a refrigerant liquid injection line 18. The refrigerant vapor injection line 14 establishes refrigerant flow communication between an upper portion of the separation chamber 72 of the flash tank economizer 70 and an intermediate stage of the compression process and a suction pressure portion of the refrigerant circuit. The refrigerant liquid injection line 18 establishes refrigerant flow communication between a lower portion of the separation chamber 72 of the flash tank 70, typically via tapping refrigerant line 4 downstream of the flash tank 70 and upstream of the primary expansion valve 55, and an intermediate stage of the compression process and a suction pressure portion of the refrigerant circuit.

In the exemplary embodiments of the refrigerant vapor compression system 10 depicted in FIG. 1, injection of refrigerant vapor or refrigeration liquid into the intermediate pressure stage of the compression process would be accomplished by injection of the refrigerant vapor or refrigerant liquid into the refrigerant passing from the first compression stage 20a into the second compression stage 20b of a single compressor or passing from the discharge outlet of the first compressor 20a to the suction inlet of the second compressor 20b. In the exemplary embodiment of the refrigerant vapor compression system 10 depicted in FIG. 2, injection of refrigerant vapor or refrigerant liquid into the intermediate pressure stage of the compression process would be accomplished by injection of the refrigerant vapor or the refrigerant liquid into the compression chamber of the scroll compressor 20 through the intermediate pressure port 26.

The refrigerant vapor compression system 10 may also include a compressor unload bypass line 16 that establishes refrigerant flow communication between an intermediate pressure stage of the compression device 20 and the suction pressure portion of said refrigerant circuit, which as noted previously constitutes refrigerant line 6 extending between the outlet of the evaporator 50 and the suction inlet of the compression device 20. In the exemplary embodiments depicted in FIGS. 1 and 2, both an upstream portion of the refrigerant vapor injection line 14 and an upstream portion of the refrigerant liquid injection line 18 open in refrigerant flow communication with the compressor unload bypass line 16 and the compressor unload bypass line 16 forms a downstream extension of both the refrigerant vapor injection line 14 and the refrigerant liquid injection line 18.

The refrigerant vapor compression system 10 may, as depicted in FIGS. 1 and 2, include a control system operatively associated therewith for selectively directing refrigerant vapor from the flash tank 70 through refrigerant vapor injection line 14 or refrigerant liquid from the flash tank 70 through refrigerant liquid injection line 18 for injection either into the primary refrigerant circuit at an intermediate pressure stage of the compression process, that is intermediate the first compression stage or the first compressor 20a and the second compression stage or the second compressor 20b, or into refrigerant line 6 that forms the suction portion of the primary refrigerant circuit. In an embodiment of the refrigerant vapor compression system 10, the control system includes a controller 100 and a plurality of flow control devices operatively associated with the refrigerant vapor injection line 14 and/or the refrigerant liquid injection line 18. In operation, the controller 100 selectively controls the positioning of each of the plurality of flow control devices between its respective open and closed positions to selectively direct refrigerant flow through the refrigerant vapor injection line 14 and the refrigerant liquid injection line 18.

In the embodiments depicted in FIGS. 1 and 2, the control includes a first flow control device 73 interdisposed in an upstream portion of refrigerant vapor injection line 14, a second flow control device 93 interdisposed in compressor unload bypass line 16 at a location intermediate the first flow control device and the intermediate pressure stage of the compression process, a third flow control device 53 interdisposed in an upstream portion of refrigerant liquid injection line 18, and a fourth flow control device 83 interdisposed in compressor unload bypass line 16 at a location intermediate the third flow control device and refrigerant line 6. Each of the aforementioned flow control devices 53, 73, 83, 93 may comprise a flow control valve selectively positionable between an open position wherein refrigerant flow may pass through the refrigerant line in which the flow control valve is interdisposed and a closed position wherein refrigerant flow is blocked through the refrigerant line in which the flow control valve is interdisposed. In an embodiment, each of the flow control valves comprises a two-position solenoid valve of the type positionable selectively positionable under the control of the controller 100 between a first open position and a second closed position.

The controller 100 not only controls operation of the various flow control valves 53, 73, 83, 93 to selectively direct refrigerant flow through the refrigerant vapor injection line 14 and the refrigerant liquid injection line 18, but also may control operation of the electronic expansion valves 55 and 65, the compression device 20, and the fans 44 and 54. As in conventional practice, in addition to monitoring ambient conditions, the controller 100 also monitors various operating parameters by means of various sensors operatively associated with the controller 100 and disposed at selected locations throughout the system. For example, in the exemplary embodiments depicted in FIGS. 1 and 2, a pressure sensor 102 is disposed in operative association with the flash tank 70 to sense the pressure within the flash tank 70, a temperature sensor 103 and a pressure sensor 104 are provided to sense the refrigerant suction temperature and pressure, respectively, and a temperature sensor 105 and a pressure sensor 106 are provided to sense refrigerant discharge temperature and pressure, respectively. The pressure sensors 102, 104, 106 may be conventional pressure sensors, such as for example, pressure transducers, and the temperature sensors 103 and 105 may be conventional temperature sensors, such as for example, thermocouples or thermistors.

A suction modulation valve (SMV) 23 may be interdisposed in refrigerant line 6 intermediate the outlet of the evaporator 50 and the suction inlet to the compression device 20. In the exemplary embodiments depicted in FIGS. 1 and 2, the suction modulation valve 23 is positioned in refrigerant line 6 between the outlet of the evaporator 50 and the point at which the compressor unload bypass line 16 intersects refrigerant line 6. Like the flow control valves 53, 73, 83, 93, operation of the suction modulation valve 23 is controlled by the controller 100. The controller 100 modulates the suction modulation valve 23 when necessary to increase or decrease the refrigerant flow through refrigerant line 6 to the suction inlet of the compression device 20 to control the cooling capacity of the refrigeration system 10. In an embodiment, the suction modulation valve 23 comprises a pulse width modulated solenoid valve.

In the embodiment depicted in FIG. 2, the refrigerant vapor compression system 10 includes a discharge pressure-to-suction pressure heat exchanger 60. The heat exchanger 60 includes a first pass 62 interdisposed in refrigerant line 4 of the primary refrigerant circuit intermediate the gas cooler 40 and the secondary expansion device 65 and a second pass 64 interdisposed in refrigerant line 6 of the primary circuit downstream of the evaporator 50 and disposed in heat exchange relationship with the first pass 62. High pressure refrigerant vapor having traversed the gas cooler 40 passes through the first pass 62 in heat exchange relationship with suction pressure refrigerant vapor having traversed the evaporator 50. In this manner, the high pressure refrigerant vapor passing through refrigerant line 4 is further cooled and the low pressure refrigerant vapor passing through refrigerant line 6 is thereby heated. This additional cooling lowers the enthalpy of the high pressure refrigerant prior to expansion via the secondary expansion device 65. Therefore, the ratio of refrigerant vapor to refrigerant liquid collecting in the flash tank 70 following expansion is reduced, which results in less refrigerant vapor being injected into the compression chamber of the scroll compressor 20 through injection port 26. This limiting of the quality of the refrigerant collecting in the flash tank 70 lowers the scroll compressor's power requirement. Additionally, the further heating of the low pressure refrigerant vapor ensures that any liquid that may remain therein is evaporated and the refrigerant vapor is superheated before passing into the suction inlet of the first compression stage or first compressor 20a of the compression device 20.

The refrigerant vapor compression system 10 may be operated in selected operating modes depending upon load requirements and ambient conditions. The controller 100 determines the desired mode of operation based upon ambient conditions and various sensed system controls and then positions the various flow control valves accordingly. To operate the refrigerant vapor compression system 10 in its standard non-economized mode, i.e. standard cycle, the controller 100 closes each of the flow control valves 53, 73, 83 and 93, whereby the refrigerant circulates through the primary refrigerant circuit only, that is from the discharge outlet of compression device 20a through refrigerant lines 2, 4 and 6 traversing in order the gas cooler 40, the secondary expansion device 65, the flash tank 70, which in this standard mode functions as a receiver only, the primary expansion valve 55, the evaporator 50 and the suction modulation valve 23 and returning to the suction inlet of the compression device 20a.

In this non-economized mode, the controller 100 controls the pressure in the flash tank 70 in response to the pressure sensed by the sensor 102 by selectively opening the flow control valves 73 and 83 to direct refrigerant vapor from the flash tank 70 through refrigerant vapor injection line 14 and a portion of the compressor unload bypass line 16 into refrigerant line 6, while keeping flow control valves 53 and 93 closed. Also, in this non-economized mode, the controller 100 responds to a high discharge temperature as sensed by temperature sensor 105 by intermittently opening the valve 53 along with the above valving configuration to direct small amount of liquid through refrigerant line 18 and through a portion of compressor unload bypass line 16 into refrigerant line 6 to desuperheat refrigerant suction flow The controller 100 may operate the refrigerant vapor compression system 10 in an economized mode by closing the flow control valves 53 and 83 and opens the flow control valves 73 and 93, whereby the refrigerant circulates not only through the primary refrigerant circuit, but also through the refrigerant vapor injection line to an intermediate pressure stage of the compression device 20a. The refrigerant passing through the primary refrigerant circuit passes from the discharge outlet of compression device 20a through refrigerant lines 2, 4 and 6 traversing in order the gas cooler 40, the secondary expansion device 65, the flash tank 70, which in this economized mode functions as an economizer and receiver, the primary expansion valve 55, the evaporator 50 and the suction modulation valve 23 and returning to the suction inlet of the compression device 20a. With flow control valves 73 and 93 open, refrigerant vapor passes from the flash tank 70 through refrigerant vapor injection line 14 and a portion of the compressor unload bypass line 16 into an intermediate pressure of the compression device 20, thereby adding an economizer cycle to the standard operating cycle.

In this economized cycle, the controller 100 responds to a high discharge temperature, as sensed by temperature sensor 105 or a high discharge pressure as sensed by pressure sensor 106, by selectively opening the flow control valves 53, 73 and 93, while keeping flow control valve 83 closed, to direct refrigerant vapor through refrigerant line 14 and refrigerant liquid through refrigerant line 18 simultaneously into and through a portion of the compressor unload bypass line 16 into an intermediate pressure stage of the compression device 20a.

Additionally, the controller 100 can unload the compression device 20 in any operating mode, by closing flow control valve 53 and 73 and opening both flow control valves 83 and 93 in the compressor unload bypass line 16. With both flow control valves 83 and 93 open, the refrigerant flows out of an intermediate stage of the compression process through the compressor unload bypass line into refrigerant line 6 to directly return to the suction side of the compression device, thereby bypassing the second compression stage or second compressor 20a thereby unloading the compression device 20. This unloading of the compressor 20 through the compressor unload bypass line 16 may be implemented in response to a high compressor discharge refrigerant temperature, or for capacity reduction or compressor power reduction. If additional capacity shedding is needed, the controller 100 can also modulate the suction modulation valve 23.

Those skilled in the art will recognize that many variations may be made to the particular exemplary embodiments described herein. For example, the refrigerant vapor compression system may also be operated in a subcritical cycle, rather than in a transcritical cycle as described hereinbefore. While the present invention has been particularly shown and described with reference to the exemplary embodiments as illustrated in the drawings, it will be understood by one skilled in the art that various changes in detail may be effected therein without departing from the spirit and scope of the invention as defined by the claims.

We claim:

1. A refrigerant vapor compression system comprising:
   a primary refrigerant circuit including a refrigerant compression device, a refrigerant heat rejection heat exchanger downstream of said compression device, a refrigerant heat absorption heat exchanger downstream of said refrigerant heat rejection heat exchanger, and a primary expansion device disposed in the refrigerant circuit downstream of said refrigerant heat rejection heat exchanger and upstream of said refrigerant heat absorption heat exchanger;
   a flash tank disposed in the refrigerant circuit downstream of said refrigerant heat rejection heat exchanger and upstream of said primary expansion device, said flash tank defining a separation chamber wherein refrigerant in a liquid state collects in a lower portion of said separation chamber and refrigerant in a vapor state in a portion of said separation chamber above the liquid refrigerant;
   a secondary expansion device disposed in the refrigerant circuit in operative association with and upstream with of said flash tank;
   a refrigerant vapor injection line establishing refrigerant flow communication between an upper portion of said separation chamber and an intermediate pressure stage of said compression device and a suction pressure portion of said primary refrigerant circuit; and
   a refrigerant liquid injection line establishing refrigerant flow communication between a lower portion of said separation chamber and an intermediate pressure stage of said compression device and a suction pressure portion of said primary refrigerant circuit.

2. The refrigerant vapor compression system as recited in claim 1 further comprising a control system for selectively directing refrigerant vapor from said flash tank through said refrigerant vapor injection line for injection either into the primary refrigerant circuit at an intermediate pressure stage of the compression process or into a suction portion of the primary refrigerant circuit and for selectively directing refrigerant liquid from said flash tank through said refrigerant liquid injection line for injection either into the primary refrigerant circuit at an intermediate pressure stage of the compression process or into a suction portion of the primary refrigerant circuit.

3. The refrigerant vapor compression system as recited in claim 2 wherein said control system includes a controller and a plurality of flow control valves operatively associated with said refrigerant vapor injection line and/or said refrigerant liquid injection line, said controller selectively controlling the positioning of each of said plurality of flow control valves between its respective open and closed positions.

4. The refrigerant vapor compression system as recited in claim 3 wherein said plurality of flow control valves comprises:
   a first flow control valve interdisposed in an upstream portion of said refrigerant vapor injection line;
   a second flow control valve interdisposed in an upstream portion of said refrigerant liquid injection line;
   a third flow control valve disposed upstream with respect to refrigerant flow of said intermediate pressure stage of said compression device and downstream with respect to refrigerant flow of both said first flow control valve and said second flow control valve; and
   a fourth flow control valve disposed upstream with respect to refrigerant flow of said suction pressure portion of said primary refrigerant circuit and downstream with respect to refrigerant flow of both said first flow control valve and said second flow control valve.

5. The refrigerant vapor compression system as recited in claim 4 wherein each of said first, second, third and fourth flow control valves comprises a solenoid valve having a first open position and a second closed position.

6. The refrigerant vapor compression system as recited in claim 2 further comprising a suction modulation valve operatively controlled by said controller and interdisposed in said refrigerant circuit downstream of said refrigerant heating heat exchanger and upstream of said compression device.

7. The refrigerant vapor compression system as recited in claim 1 further comprising a compressor unload bypass line establishing refrigerant flow communication between an intermediate pressure stage of said compression device and a suction pressure portion of said refrigerant circuit.

8. The refrigerant vapor compression system as recited in claim 7 wherein said compressor unload bypass line forms a downstream extension of said refrigerant vapor injection line and a downstream extension of said refrigerant liquid injection line.

9. The refrigerant vapor compression system as recited in claim 8 further comprising:
   a first flow control valve interdisposed in an upstream portion of said refrigerant vapor injection line;
   a second flow control valve interdisposed in an upstream portion of said refrigerant liquid injection line;
   a third flow control valve interdisposed in said compressor unload bypass line upstream with respect to refrigerant flow of said intermediate pressure stage of said compression device; and
   a fourth flow control valve interdisposed in said compressor unload bypass line upstream with respect to refrigerant flow of said suction pressure portion of said primary refrigerant circuit.

10. The refrigerant vapor compression system as recited in claim 9 wherein each of said first, second, third and fourth flow control valves comprises a solenoid valve having a first open position and a second closed position.

11. The refrigerant vapor compression system as recited in claim 1 wherein said system operates in a transcritical cycle.

12. The refrigerant vapor compression system as recited in claim 1 wherein the refrigerant comprises carbon dioxide.

13. The refrigerant vapor compression system as recited in claim 1 wherein said compression device comprises a single compressor having at least a first lower pressure compression stage and a second higher pressure compression stage.

14. The refrigerant vapor compression system as recited in claim 13 further comprising a refrigerant-to-refrigerant heat exchanger having a first refrigerant pass disposed in heat exchange relationship a second refrigerant pass, said first refrigerant pass interdisposed in said primary refrigerant circuit intermediate said refrigerant heat rejection heat exchanger and said secondary expansion device and said second refrigerant pass interdisposed in said primary refrigerant circuit intermediate said refrigerant heat absorption heat exchanger and said compression device 20.

15. The refrigerant vapor compression system as recited in claim 1 wherein said compression device comprises a first compressor and a second compressor disposed in said refrigerant circuit in series refrigerant flow relationship with a discharge outlet of said first compressor in refrigerant flow communication with a suction inlet of said second compressor.

16. The refrigerant vapor compression system as recited in claim 1 wherein said compression device comprises a scroll compressor.

17. The refrigerant vapor compression system as recited in claim 1 wherein said compression device comprises a screw compressor.

18. The refrigerant vapor compression system as recited in claim 1 wherein said compression device comprises a reciprocating compressor.

19. The refrigerant vapor compression system as recited in claim 1 wherein said primary expansion device comprises an electronic expansion valve.

20. The refrigerant vapor compression system as recited in claim 1 wherein said primary expansion device comprises a thermostatic expansion valve.

21. The refrigerant vapor compression system as recited in claim 1 wherein said secondary expansion device comprises an electronic expansion valve.

22. The refrigerant vapor compression system as recited in claim 1 wherein said secondary expansion device comprises a fixed orifice expansion device.

23. A method of operating a refrigerant vapor compression system in a transcritical cycle comprising the steps of:
 compressing a refrigerant to a supercritical condition in a two-stage compression process;
 passing the supercritical pressure refrigerant in heat exchange relationship with a cooling medium;
 expanding the supercritical condition refrigerant in a first expansion step to a subcritical pressure to form a first expanded refrigerant including refrigerant vapor and refrigerant liquid;
 separating the first expanded refrigerant into a refrigerant vapor portion and a refrigerant liquid portion;
 expanding at least a portion of the refrigerant liquid portion in a second expansion step to a lower pressure to a second expanded refrigerant including refrigerant liquid;
 evaporating the second expanded refrigerant;
 selectively directing a portion of the refrigerant vapor portion either into an intermediate stage of the compression process or into a suction pressure portion of the refrigerant vapor compression system; and
 selectively directing a portion of the refrigerant liquid portion either into an intermediate stage of the compression process or into a suction pressure portion of the refrigerant vapor compression system.

24. The method as recited in claim 23 further comprising the step of controlling the pressure of the supercritical pressure refrigerant passing in heat exchange relationship with a cooling medium to a desired pressure by selectively controlling the flow rate of supercritical pressure refrigerant expanded in said first expansion step.

25. The method as recited in claim 23 further comprising in a first mode of operation the steps of:
 selectively passing a portion of the refrigerant vapor portion into an intermediate pressure stage of the compression process; and
 selectively blocking passage of the refrigerant liquid portion either into an intermediate pressure stage of the compression process or into a suction pressure portion of the refrigerant vapor compression system.

26. The method as recited in claim 23 further comprising in a second mode of operation the steps of:
 selectively passing a portion of the refrigerant vapor portion into an intermediate pressure stage of the compression process; and
 simultaneously selectively passing a portion of the refrigerant liquid portion into an intermediate pressure stage of the compression process.

27. The method as recited in claim 23 further comprising in a third mode of operation the steps of:
 selectively passing a portion of the refrigerant vapor portion into a suction pressure portion of the refrigerant vapor compression system; and
 simultaneously selectively passing a portion of the refrigerant liquid portion into a suction pressure portion of the refrigerant vapor compression system.

28. The method as recited in claim 23 further comprising in a fourth mode of operation the step of controlling said subcritical pressure in said flash tank by selectively passing a portion of the refrigerant vapor portion into a suction pressure portion of the refrigerant vapor compression system.

29. A refrigerant vapor compression system for use in connection with a transport refrigeration system comprising:
 a primary refrigerant circuit including a refrigerant compression device, a refrigerant heat rejection heat exchanger downstream of said compression device, a refrigerant heat absorption heat exchanger downstream of said refrigerant heat rejection heat exchanger, and a primary expansion device disposed in the refrigerant circuit downstream of said refrigerant heat rejection heat exchanger and upstream of said refrigerant heat absorption heat exchanger;
 a flash tank disposed in the refrigerant circuit downstream of said refrigerant heat rejection heat exchanger and upstream of said primary expansion device, said flash tank defining a separation chamber wherein refrigerant in a liquid state collects in a lower portion of said separation chamber and refrigerant in a vapor state in a portion of said separation chamber above the liquid refrigerant;
 a secondary expansion device disposed in the refrigerant circuit in operative association with and upstream with of said flash tank;
 a refrigerant vapor injection line establishing refrigerant flow communication between an upper portion of said separation chamber and an intermediate pressure stage of said compression device and a suction pressure portion of said primary refrigerant circuit; and
 a refrigerant liquid injection line establishing refrigerant flow communication between a lower portion of said separation chamber and an intermediate pressure stage of said compression device and a suction pressure portion of said primary refrigerant circuit.

30. The refrigerant vapor compression system as recited in claim 29 further comprising a control system for selectively directing refrigerant vapor from said flash tank through said refrigerant vapor injection line for injection either into the primary refrigerant circuit at an intermediate pressure stage of the compression process or into a suction portion of the primary refrigerant circuit and for selectively directing refrigerant liquid from said flash tank through said refrigerant liquid injection line for injection either into the primary refrigerant circuit at an intermediate pressure stage of the compression process or into a suction portion of the primary refrigerant circuit.

31. The refrigerant vapor compression system as recited in claim 30 wherein said control system includes a controller and a plurality of flow control valves operatively associated with said refrigerant vapor injection line and/or said refrigerant liquid injection line, said controller selectively controlling the positioning of each of said plurality of flow control valves between its respective open and closed positions.

32. The refrigerant vapor compression system as recited in claim 30 further comprising a compressor unload bypass line establishing refrigerant flow communication between an intermediate pressure stage of said compression device and a suction pressure portion of said refrigerant circuit.

33. The refrigerant vapor compression system as recited in claim 32 wherein said compressor unload bypass line forms a downstream extension of said refrigerant vapor injection line and a downstream extension of said refrigerant liquid injection line.

34. The refrigerant vapor compression system as recited in claim 33 further comprising:
a first flow control valve interdisposed in an upstream portion of said refrigerant vapor injection line;
a second flow control valve interdisposed in an upstream portion of said refrigerant liquid injection line;
a third flow control valve interdisposed in said compressor unload bypass line upstream with respect to refrigerant flow of said intermediate pressure stage of said compression device; and
a fourth flow control valve interdisposed in said compressor unload bypass line upstream with respect to refrigerant flow of said suction pressure portion of said primary refrigerant circuit.

35. The refrigerant vapor compression system as recited in claim 34 wherein each of said first, second, third and fourth flow control valves comprises a solenoid valve having a first open position and a second closed position.

36. The refrigerant vapor compression system as recited in claim 34 further comprising a suction modulation valve operatively controlled by said controller and interdisposed in said refrigerant circuit downstream of said refrigerant heating heat exchanger and upstream of said compression device.

37. The refrigerant vapor compression system as recited in claim 30 wherein said system operates in a transcritical cycle.

38. The refrigerant vapor compression system as recited in claim 37 wherein the refrigerant comprises carbon dioxide.

39. The refrigerant vapor compression system as recited in claim 30 wherein said compression device comprises a scroll compressor.

40. The refrigerant vapor compression system as recited in claim 30 further comprising a refrigerant-to-refrigerant heat exchanger having a first refrigerant pass disposed in heat exchange relationship a second refrigerant pass, said first refrigerant pass interdisposed in said primary refrigerant circuit intermediate said refrigerant heat rejection heat exchanger and said secondary expansion device and said second refrigerant pass interdisposed in said primary refrigerant circuit intermediate said refrigerant heat absorption heat exchanger and said compression device 20.

41. The refrigerant vapor compression system as recited in claim 30 wherein said compression device comprises a screw compressor.

42. The refrigerant vapor compression system as recited in claim 30 wherein said compression device comprises a reciprocating compressor.

* * * * *